(12) United States Patent  
Englert

(10) Patent No.: US 8,976,245 B2  
(45) Date of Patent: Mar. 10, 2015

(54) OPTICAL ORBITAL DEBRIS SPOTTER

(75) Inventor: Christoph R Englert, Springfield, VA (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 420 days.

(21) Appl. No.: 13/571,712

(22) Filed: Aug. 10, 2012

(65) Prior Publication Data

US 2013/0147952 A1    Jun. 13, 2013

Related U.S. Application Data

(60) Provisional application No. 61/568,995, filed on Dec. 9, 2011.

(51) Int. Cl.  
*H04N 13/04* (2006.01)  
*H04N 7/18* (2006.01)  
*B64G 1/66* (2006.01)  
*B64G 1/10* (2006.01)

(52) U.S. Cl.  
CPC ... *B64G 1/66* (2013.01); *B64G 1/10* (2013.01)  
USPC .................................. 348/144; 348/E07.085

(58) Field of Classification Search  
None  
See application file for complete search history.

(56) References Cited

U.S. PATENT DOCUMENTS 7,105,791 B1 * 9/2006 Poller .................. 250/203.1

* cited by examiner

*Primary Examiner* — Sath V Perungavoor  
*Assistant Examiner* — Nam Pham  
(74) *Attorney, Agent, or Firm* — US Naval Research Laboratory; L. George Legg

(57) ABSTRACT

An orbital debris detection system positionable on a satellite launchable into an earth orbit includes a light source having a collimated light output, a curved mirror for receiving the collimated light output and forming a light sheet outside the satellite, and a scattered light detector for detecting a scattered light from the light sheet resulting from orbital debris intersecting the light sheet and scattering light toward the detector. The system can provide damage attribution on a space vehicle (whether it was just hit by a piece of debris), data gathering for debris models (time, location, approximate debris size, direction of trajectory) that are starved for information on small (<1 cm) debris pieces, measuring density and distribution of predominantly small (<1 cm) orbital debris in a debris cloud (e.g. a cloud that is the result of a satellite collision), and monitoring the performance of orbital debris removal efforts that target small debris.

18 Claims, 1 Drawing Sheet

OPTICAL ORBITAL DEBRIS SPOTTER

CROSS-REFERENCE TO RELATED APPLICATIONS

This Application claims the benefit of U.S. Provisional Application 61/568,995 filed on Dec. 9, 2011 and incorporated herein by reference.

FIELD OF THE INVENTION

The invention is directed to a method and system for detecting orbital debris, and in particular is directed to an on-board satellite orbital debris detection system and satellite damage attribution.

BACKGROUND OF THE INVENTION

Orbital debris is an increasing concern to all satellite operations due to the effects of high velocity collisions which range from minor to catastrophic. More than twenty thousand Earth orbiting objects are currently catalogued and tracked. Most of the tracked objects are larger than ~1-10 cm, since the smaller objects are increasingly hard to detect. However, even objects of 1 cm in size and smaller can inflict serious damage to operational satellites, since relative speeds of several kilometers per second are typical for orbital collisions. For comparison, the speed of a 22 caliber bullet leaving the barrel of a gun is about 0.3 km/s.

Collisions with large objects can currently be predicted albeit with significant uncertainties. On the other hand, the increasing number of small objects in orbit, originating from satellite collisions and anti-satellite events as well as other current space activities, is a growing concern. The number of these small objects is expected to increase into the 100 thousands, which makes then very difficult to catalog and track, especially since they are hard to detect. Collisions with small orbit debris are responsible for effects ranging from the continuous degradation of satellite performance (e.g. solar cells) to the instant damage of vital satellite components. The unambiguous attribution of such anomalies to small debris collisions is currently very difficult.

The current densities of objects in Earth orbit might in some altitude regions have even surpassed a critical value, which would soon cause a run-away chain reaction in which the creation of debris will occur faster than the removal of the debris due to the natural orbital drag. In that scenario (Kessler syndrome), all operational satellites in these particular orbit regions would turn into debris within months or years.

Several mitigations for the debris problem have been proposed and some of them are already operational. To protect spacecraft, debris shields can be used. These are particularly effective for very small debris (micron size, micrometeorites). Improved shield designs have also been proposed. However, some parts of spacecraft are hard to shield, like solar panels or optical apertures. Maneuvers to avoid collisions are possible for spacecraft that have on-board propulsion, if a likely collision is anticipated early enough.

In this environment of increasing small orbital debris, it is desirable to provide an approach to improve debris detection and anomoly attribution.

BRIEF SUMMARY OF THE INVENTION

According to the invention, an orbital debris detection system positionable on a satellite launchable into an earth orbit includes a collimated light source, e.g. a laser, a curved mirror for receiving the collimated light output and forming a light sheet outside the satellite, and a scattered light detector for detecting a scattered light from the light sheet resulting from orbital debris intersecting the light sheet and scattering light back toward the detector.

Exemplary applications of the invention are damage attribution on a space vehicle (whether it was just hit by a piece of debris), data gathering for debris models (time, location, approximate debris size, direction of trajectory) that are starved for information on small (<1 cm) debris pieces, measuring density and distribution of predominantly small (<1 cm) orbital debris in a debris cloud (e.g. a cloud that is the result of a satellite collision), and monitoing the performance of orbital debris removal efforts that target small debris.

In general, many debris studies are performed using satellite surfaces that are damaged by debris impacts and that are brought back to Earth after weeks, months or years in orbit. The Optical Orbital Debris Spotter concept would provide, at a minimum, a similar or even improved data set (e.g. including trajectory directions), in close to real time and without bringing the "surface" back to Earth.

The invention provides near real time knowledge of the presence of debris pieces and their location (direction) and near real time information on the approximate size of the detected debris pieces. Small debris pieces in the vicinity of the host satellite are difficult to detect from the ground or space based assets, that are separated by a large distance from the debris, are detectable with the invention.

DETAILED DESCRIPTION OF THE INVENTION

Figure 1:
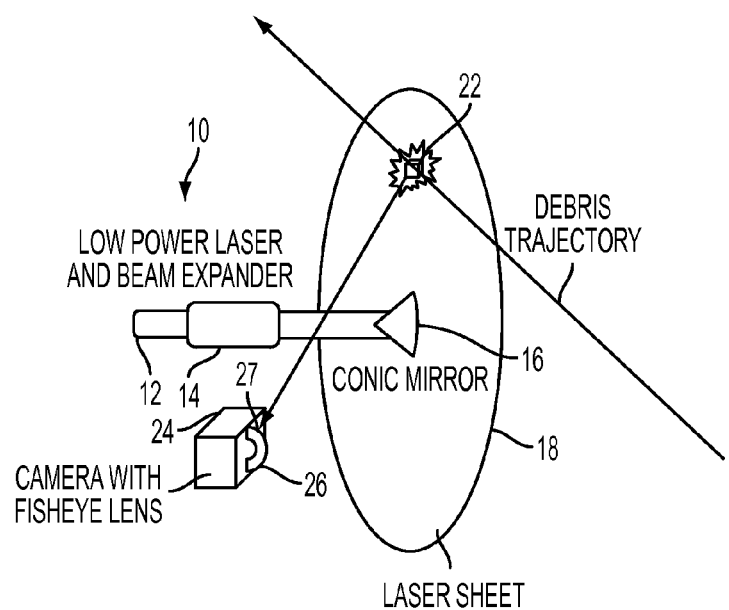
FIG. 1 is a perspective view of an orbital debris detection system according to the invention.
Figure 2:
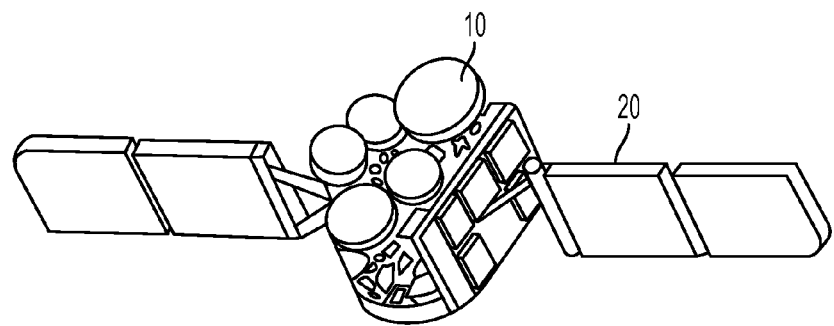
FIG. 2 is a perspective view of a satellite with an on-board orbital debris detection system according to the invention.

Referring now to FIGS. 1-2, the orbital debris detection system 10 according to the invention includes a collimated light source 12, e.g. a low power laser or another collimated light source, coupled to an optional beam expander 14, a curved mirror 16, e.g. a conic mirror, that together effectively create a light sheet 18 outside a satellite 20 in which system 10 is positioned. The term "light sheet" means that a two-dimensional surface, e.g. a plane or a cone, is formed by the laser light, and that light sheet 18 extends outward with decreasing intensity. Once the flight path (i.e. orbit trajectory) of a small object 22 (e.g. small space debris) intersects the light sheet 18, it will scatter the light according to its size, shape, and surface properties. Part of the scattered light will be detected by a scattered light detector 24, e.g. a charge coupled device (CCD) camera interfaced with a wide angle lens 26 (e.g. a fisheye lens with ~180° field of view). The sensitivity of the system to an object intersecting the light sheet depends on the intensity of the light source that forms the light sheet, the distance of the object to the origin on the light sheet, i.e. the curved mirror, the distance of the object to the scattered light detector, and the scattering properties of the object, which is a function of the object size, shape, and surface properties. The system 10 is capable of detecting the presence of a typical small piece of debris in the range of meters or more as shown by the following idealized signal estimation:

Assumptions for preliminary signal estimate:

Laser source power: 5 mW which is equivalent to 1.58 e16 photons per second at $\lambda$=630 nm (equivalent to a laser pointer)

Scale of debris piece: 1 cm³, optical cross section: ~1 cm², homogeneously scattering in a solid angle of 2π

Debris speed: 10 km/s=1 e6 cm/s

Time of projectile in sheet: 1 cm/1 e6 cm/s=1 e-6 s

Camera entrance aperture: 1 cm²

Distance between conic mirror and trajectory intersection with light sheet: 1 m

Distance between camera and trajectory intersection with light sheet: 1 m

Filter transmittance: 100%

Predicted signal: 400 photons, which is readily detectable using current state of the art detector arrays in the visible or near UV.

A more powerful laser can be utilized to increase the detection range, i.e. the distance from the satellite at which orbital debris of a given size/shape/surface can be detected and/or cataloged. For example, a more powerful laser with increased range might be desirable if a satellite is configured to detect a debris field while traversing a region heavy with orbital debris, e.g. one where two other satellites have previously engaged in a debris-causing collision event. Lower power systems can be utilized for those configurations designed for anomaly attribution.

Several design details and features can be used to increase the performance and reliability of the device:

(1) In order to minimize parasitic light from other sources like the Moon, Sun, and the Earth's disk, the FOV can be optimized, e.g. to never view the Earth's disk from a nadir stabilized SIC.

(2) In order to minimize parasitic light from other sources like the Moon, Sun, and the Earth's disk, the light sheet can be created using a monochromatic source (e.g. laser) and the camera can be combined with an optional narrow band interference filter 27, so that only the laser wavelength is detected.

(3) In order to minimize parasitic light from other sources like the Moon, Sun, and the Earth's disk, the wavelength of the light sheet and or the camera sensitivity can be restricted to favorable wavelengths like the ultraviolet, where the sun is less bright and the earth's atmosphere is opaque.

(4) Consecutive image differencing can be used to effectively suppress background signals and slowly changing scene variations.

(5) To avoid confusion of cosmic ray events within the detector array (which also cause localized signals) with the detection of a passing debris piece, a second camera can be used or the image can be split and focused on two different areas of the same detector array. Thus, getting an event detection for both images is a reliable indicator for a debris event, as opposed to a cosmic ray event on one location of the detector array.

(6) A second, not collocated system (on the same S/C) can be used to get debris trajectory directional information from the combination of both data sets using two intersection points.

(7) If two light sheets are used, they can be created using a different color (wavelength), to separate the signals from the two light sheets at the detector, in case the same detector is used, or both sheets are in the FOV of seperate detection systems.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed as new and desired to be protected by Letters Patent of the United States is:

1. An orbital debris detection system positioned on-board a satellite launchable into an earth orbit, comprising:
   a light source having a collimated light output;
   a curved mirror for receiving the collimated light output and forming a two-dimensional light sheet surface outside the satellite; and
   a scattered light detector for detecting a scattered light from the two-dimensional light sheet surface resulting from orbital debris intersecting the two-dimensional light sheet surface and scattering light therefrom, and wherein the scattered light detector is a camera interfaced with a lens.

2. The orbital debris detection system of claim 1, further comprising a beam expander for receiving the collimated light output and providing an expanded collimated light output to the mirror.

3. The orbital debris detection system of claim 1, wherein the scattered light detector is a charge coupled device (CCD) camera interfaced with a wide angle lens.

4. The orbital debris detection system of claim 1, wherein the light source output is in the visible or near UV frequency range.

5. The orbital debris detection system of claim 1, wherein the light source output is in the UV frequency range.

6. The orbital debris detection system of claim 1, wherein the detector further includes an interference filter.

7. An orbital debris detection system positioned on-board a satellite launchable into an earth orbit, comprising:
   a first light source having a first collimated light output;
   a first curved mirror for receiving the first expanded collimated light output and forming a first two-dimensional light sheet surface outside the satellite;
   a second light source having a second collimated light output;
   a second curved mirror for receiving the second expanded collimated light output and forming a second two-dimensional light sheet surface outside the satellite; and
   a scattered light detector for detecting the first scattered light from the first two-dimensional light sheet surface and the second scattered light from the second two-dimensional light sheet surface, whereby directional information is obtained about the orbital debris, and wherein the scattered light detector is a camera interfaced with a lens.

8. The orbital debris detection system of claim 7, further comprising:
   a first beam expander for receiving the first collimated light output and providing a first expanded collimated light output to the first curved mirror; and
   a second beam expander for receiving the second collimated light output and providing a second expanded collimated light output to the second curved mirror.

9. The orbital debris detection system of claim 7, wherein the scattered light detector is a charge coupled device (CCD) camera interfaced with a wide angle lens.

10. The orbital debris detection system of claim 7, wherein each light source output is in the visible or near UV frequency range.

11. The orbital debris detection system of claim 7, wherein each light source output is in the UV frequency range.

12. The orbital debris detection system of claim 7, wherein the scattered light detector further includes an interference filter.

13. A method for detecting orbital debris in the vicinity of a satellite, comprising:
   deploying the satellite into an earth orbit;
   generating a collimated light output on board the satellite;
   reflecting the collimated light beam output from the satellite to a region outside the satellite to form a two-dimensional light sheet surface outside the satellite; and
   detecting light scattered from the two-dimensional light sheet surface caused by orbital debris intersecting the two-dimensional light sheet surface to thereby detect the presence of the orbital debris in the vicinity of the satellite, and wherein detecting the scattered light is conducted using a camera interfaced with a lens.

14. The method of claim 13, wherein the collimated light output is in the visible or near UV frequency range.

15. The method of claim 13, wherein the collimated light output is in the UV frequency range.

16. The method of claim 13, wherein the detected light is passed through an interference filter.

17. The method of claim 13, further comprising expanding the generated collimated light output before reflecting the collimated light output from the satellite to the region outside the satellite and forming the two-dimensional light sheet surface outside the satellite.

18. The method of claim 13, wherein detecting the scattered light is conducted using a charge coupled device (CCD) camera interfaced with a wide angle lens.

* * * * *